United States Patent [19]

Wheatley, III

[11] 4,410,954

[45] Oct. 18, 1983

[54] DIGITAL FREQUENCY SYNTHESIZER WITH RANDOM JITTERING FOR REDUCING DISCRETE SPECTRAL SPURS

[75] Inventor: Charles E. Wheatley, III, Chino, Calif.

[73] Assignee: Rockwell International Corporation, El Segundo, Calif.

[21] Appl. No.: 195,274

[22] Filed: Oct. 8, 1980

[51] Int. Cl.³ .......................................... H03K 13/32
[52] U.S. Cl. ...................................... 364/701; 328/14
[58] Field of Search ....................... 364/701, 718, 721; 328/14, 165

[56] References Cited

U.S. PATENT DOCUMENTS

| 3,772,681 | 11/1973 | Skingle | 328/14 X |
|---|---|---|---|
| 3,803,500 | 4/1974 | Taudt et al. | 328/185 |
| 3,860,799 | 1/1975 | Donco | 328/30 X |
| 3,882,403 | 5/1975 | Gerken | 328/14 |
| 4,011,516 | 3/1977 | Heimbigner et al. | 328/14 |
| 4,025,865 | 5/1977 | Munday et al. | 328/14 |
| 4,144,579 | 3/1979 | Nossen et al. | 328/14 X |
| 4,185,247 | 1/1980 | Harrison, Jr. | 328/14 X |
| 4,213,185 | 7/1980 | Muri et al. | 364/721 |
| 4,328,554 | 5/1982 | Mantione | 328/14 X |

Primary Examiner—David H. Malzahn
Attorney, Agent, or Firm—H. Fredrick Hamann; Rolf M. Pitts; Randall G. Wick

[57] ABSTRACT

A digital frequency synthesizer for synthesizing a selected frequency or a library of preselected frequencies in which a selected phase increment is fed at a clock rate to an adder and accumulating register in mutual cooperation as a digital integrator, the resultant period overflow of the register corresponding to the selected frequency of interest. An improvement is provided for reducing discrete spectral spurs in the spectral output of the synthesizer by means of preselectively randomly jittering the input to, or output of, the register, whereby the average periodicity of the register overflow for a selected frequency is not affected.

17 Claims, 7 Drawing Figures

DIGITAL FREQUENCY SYNTHESIZER WITH RANDOM JITTERING FOR REDUCING DISCRETE SPECTRAL SPURS

BACKGROUND OF THE INVENTION

The invention herein described was made in the course of or under a contract or subcontract thereunder, with the Department of the Air Force.

The concept of the invention relates to digital frequency synthesizer means for synthesizing a selected frequency of a library of preselected frequencies, and more particularly to means for reducing discrete spectral spurs in the spectral output of the synthesizer.

In the design of radio communications systems, a continuing goal has been the design of a simple, low-cost frequency synthesizer that can provide a large library of discrete frequencies over a very wide frequency spectrum. Design efforts toward this goal have introduced an associated spectrum of spurious outputs, the minimization of which has been less than successful or satisfactory.

Prior art solutions attempted have usually been too complex for commercial feasibility, lacking the desired simplicity. Most such prior-art solutions which seek to employ digital logic, have also required the use of hybrid devices such as digital-to-analog (D/A) converters and table look-up devices such as sine/cosine Read Only Memories (ROM's), a primary purpose of these additional elements being to reduce the poor output spectral quality. Such associated poor output spectral quality is mainly demonstrated by the presence of a large number of unwanted line spectral components, usually about 50 to 55 db below the desired carrier level.

BRIEF DESCRIPTION OF THE INVENTION

By means of the concept of the subject invention, the above-noted shortcomings of the prior art are avoided, and there is provided improved digital frequency synthesizer means for synthesizing a selected frequency of a library of preselected frequencies and providing an output of reduced spurious spectral content.

There is provided means for feeding a value corresponding to a selected phase increment at a clock rate to an adder, which is in mutual cooperation with an accumulating register as a digital integrator, the resultant periodic overflow of the register corresponding to the selected frequency of interest. In a preferred embodiment there is included means for randomly jittering one of the output and input of the register, whereby the average periodicity of the register overflow for a selected frequency is not affected.

More particularly, there is provided means for generating a random sequence of values, the difference between any one of which and the selected phase increment being less than the phase increment. Jitter logic, responsive to the overflow output of the accumulating register, substitutes a sequential one of the random values for the phase increment value as an input to the register for at least one clock interval occurring within the duration between successive overflows of the register.

In normal operation of the above-described arrangement, the levels of the spurious spectral lines associated with the digital frequency synthesizer are eliminated, being replaced with a continuous noise spectrum, the level of such noise spectrum decreasing at the clock frequency is increased, while the average carrier frequency output is unaffected.

Accordingly, it is an object of the invention to provide an improved digital frequency synthesizer.

It is another object to provide a digital frequency synthesizer having an output of reduced spurious spectral content, wherein discrete spectral lines are replaced with a continuous noise spectrum.

Still another object is to provide means for reducing the spurious spectral content in a digitally synthesized carrier signal without disturbing the average value of the carrier frequency.

These and other objects of the invention will become apparent from the following description, taken together with the accompanying drawings in which:

BRIEF DESCRIPTION OF THE DRAWINGS

In the figures, like reference characters refer to like parts.

DESCRIPTION OF THE PREFERRED EMBODIMENTS

Figure 1:
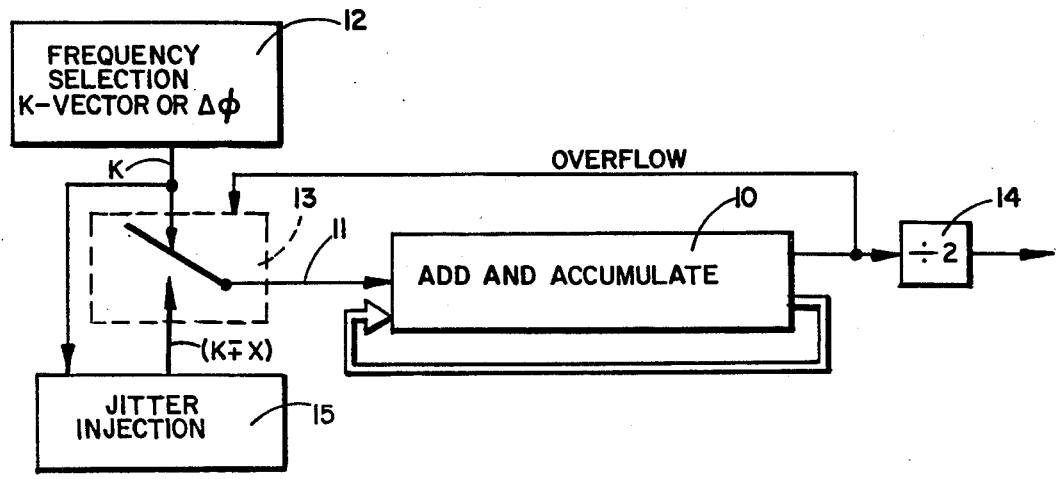
FIG. 1 is a block diagram of a system in which the concept of the jitter injection feature of the invention may be advantageously employed.

Referring now to FIG. 1, there is illustrated a block diagram of a system in which the concept of the invention may be advantageously employed. There is provided an externally-clocked add-and-accumulate register 10 having an input 11 coupled to a source 12 of a selectible K-vector or phase increment, $\Delta\Phi$ by means of switch 13. In normal cooperation of elements 10 and 12, element 10 is incremented by a selected value ($\Delta\Phi$), applied by element 12, at a fixed rate, determined by an external, constant-frequency clock (not shown). The accumulation of such fixed-rate-applied values ($\Delta\Phi$) results in periodic overflow of the accumulating register, the periodicity of which corresponds to the synthesized frequency of interest. A divider element 14 is utilized at the output of element 10 in order to improve the wave shape of the periodic output signal from element 10.

By changing the value selected for $\Delta\Phi$, as supplied by source 12, the periodicity or synthesized frequency of the accumulator output may be changed, an increase in the K-vector or phase increment resulting in more frequent overflows of the accumulator, or a higher (synthesized) frequency, while a K-vector decrease results in a correspondingly lower output frequency.

If the maximum capacity of the accumulator corresponds to the value N counts, and the accumulator is incremented by only one count (K=1) every clock time, then the minimum synthesized frequency $f_{min}$ equals $$\frac{1}{N} f_{(clock)}.$$

In general, if the accumulator is incremented by K counts every clock time, the frequency $f_{(output)}$ of the accumulator overflow is $$\frac{K}{N} f_{(clock)}.$$

In other words, the accumulator overflow periodicity, $t=1/F_{output}$, is equal to the product of N/K clock counts and the clock periodicity $1/f_{clock}$:

$$\frac{1}{f_{output}} = \frac{N}{Kf_{clock}}.$$

Figures 4, 5:
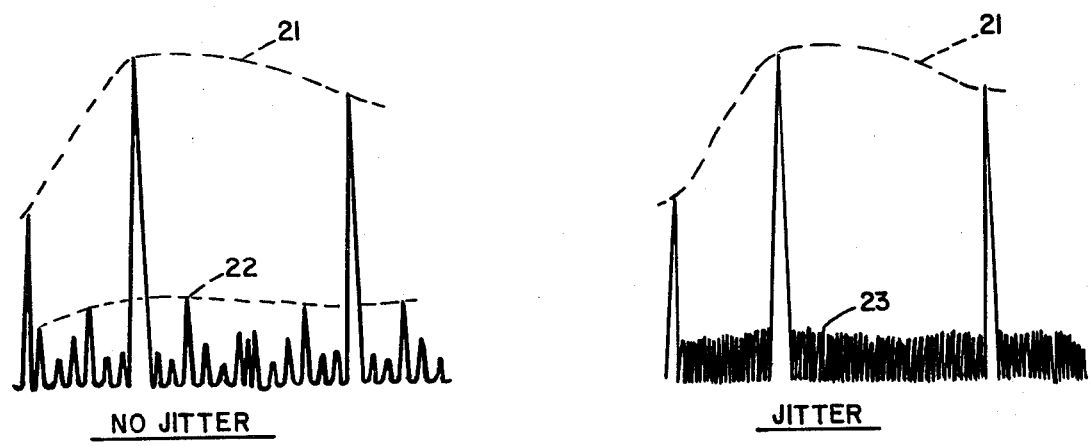
FIG. 4 is a representative spectral density diagram, illustrating the relative height of the spurious spectral lines incident to digital synthesis of a carrier frequency.
FIG. 5 is an exemplar spectral density diagram, illustrating the attenuated nature of the spurious spectral content, which attenuation is achieved by means of the invention.

If N is not an integer multiple of K, then the spectral pattern produced by the accumulator overflow output will, in addition to displaying the spectral line corresponding to the synthesized frequency (and harmonics thereof), introduce a periodic modulation which causes a spurious line spectrum, as illustrated in FIG. 4, upper envelope curve 21 representing the synthesized frequency and first and second harmonics thereof, while the lower envelope 22 represents the spurious line spectrum. A usual prior art method for lowering the envelope 22 of unwanted spectral lines, has been to employ a linear-to-sine digital converter at the output of adder-accumulator 10 (in FIG. 1), followed by a digital-to-analog converter, which cooperates to generate an approximation to a sine wave and which has an inherently lower spurious response than the output waveform directly available from the accumulator.

Figure 2:
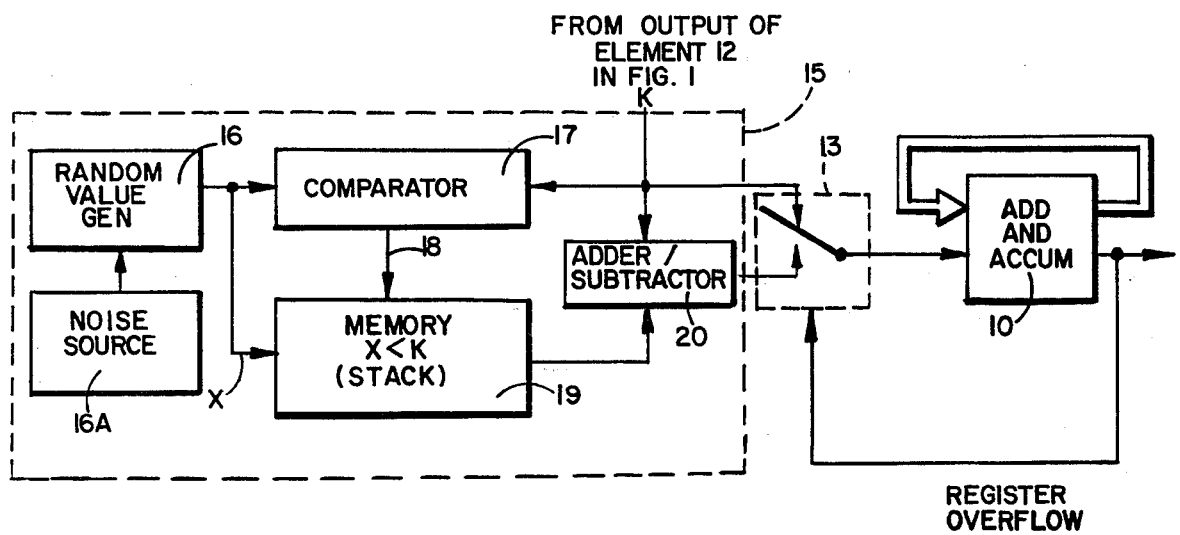
FIG. 2 is a block diagram of an aspect of the invention schematically illustrating means for generating the jitter injection employed in FIG. 1.

By means of the concept of the invention, the use of such digital sine converter and D/A converter are avoided while the periodic output modulation resulting from the fixed difference between K and N is distributed or removed, thus removing or reducing the spurious discrete line spectrum. Such beneficial effect is achieved by means of adding or substituting a random value to the accumulator sum for at least one clock period or count within each period of the accumulator overflow periodicity, and during the next or subsequent overflow period subtracting the old random number and adding a new random number. Such random jitter method of jittering or randomly adjusting the accumulator overflow period (i.e., the period required to achieve an overflow condition in the accumulator) does not affect the average synthesized frequency, $$f_{(output)} = \frac{K}{N} f_{(clock)},$$

and is provided in FIG. 1 by the cooperation of switching element 13 and jitter injection logic element 15, shown more particularly in one aspect in FIG. 2.

Referring now to FIG. 2, there is illustrated in further detail the jitter logic element 15 in cooperation with switch 13 and adder/accumulator 10 of FIG. 1. The jitter injection means 15 includes means for generating a random-digital value X, comprising a digital value generator or digitizer 16 responsive to a noise source 16A.

There is further provided a comparator 17 responsive to the random value output (X) of digitizer 16 and to the K-vector or phase increment value output from frequency selector 12 (in FIG. 1), to provide a gate control signal output (on line 18) indicative of the occurrence (X<K) of a random value (X) which is less than the phase increment or K vector. Such gate control signal is employed to control a gated memory stack 19 or register which is responsively coupled to the output of digitizer 16. Thus, gated memory 19 sequentially stores or stacks only those randomly-occurring values of X which are less than the K-vector value, such randomly-occurring values being stored in the sequence of occurrence in the time domain.

During a majority of the periodicity of interval between accumulator overflows, switch 13 is in the normal state illustrated in FIG. 2, whereby the K-vector value is applied as an input to to element 10. During a preselected portion of such interval, switch 13 connects the input of adder/accumulator 10 to an output of an adder/subtractor 20. Adder/subtractor 20 is responsive to the K-vector value and to an output of memory stack 19 for generating values $(K+X_i)$ and $(K-X_{i-1})$, where $X_i$ refers to a current random number output of a sequence of random numbers stored in memory 19, and $X_{i-1}$ refers to the previous random number extracted from the stack of random numbers stored in memory 19. During one clock count of the two-clock count interval (within the accumulator overflow periodicity) in which switch 13 connects the output of adder/subtractor 20 to an input of element 10, element 20 subtractively combines the previously random number $(X_{i-1})$ and the K-vector, to provide the random value $(K-X_{i-1})$ as an adjusted phase increment value to the input of element 10. During the other clock count of the two clock count interval, adder/subtractor 20 additively combines the current random number $(X_i)$ and the K-vector, to provide the random value $(K+X_i)$ as an adjusted phase increment value to the input of element 10. In other words, within the interval between two successive accumulator overflow occurrences, element 20 in cooperation with switch 13 injects a current random jitter value $(X_i)$ into add/accumulator 10 for at least one clock count and subtracts a previous jitter value $(X_{i-1})$ which had been injected during a clock count of previous accumulator overflow period.

Thus, it is to be appreciated that the periodicity of successive periods of the accumulator overflow is randomly jittered about a nominal or fixed periodicity, as to avoid the modulation effect associated with the accumulator capacity N not being an integer multiple of the selected K-vector or phase increment. Such effect may be noted in FIG. 5, by comparing envelope 23 thereof with envelope 22 of FIG. 4.

The advantageous consequences of such mechanization are to (1) maintain the correct average frequency $$\frac{K}{N} f_{(clock)},$$

(2) eliminate all discrete spectral spurs, (3) eliminate the prior-art need for a linear-to-sine digital converter, and (4) eliminate the prior art need for a digital-to-analog converter.

The design cost of this randomizing process is to introduce a noise floor equal in total power to that of the spectral line spurs which have been deleted. In other words, while the level or height of envelope 23 in FIG.

5 is generally lower than envelope 22 of FIG. 4, the total energy represented by envelope 23 in FIG. 5 is the same as that for envelope 22 of FIG. 4. The level 23 of the noise floor in FIG. 5 resulting from practicing the concept of the invention, can be expressed in terms of its power density in a one-hertz bandwidth, relative to the power of the desired output: mathematically it can be shown that the carrier power to noise power density ratio, $C/N_o$, is approximately equal to $F^2(clock)/f(output)$. Thus, as the clock frequency increases, the carrier to noise ratio increases (i.e., improves) as the square of the clock frequency.

A further and overriding nature of the inventive concept is that the mechanization thereof is totally digital. The random number of jitter injection is only required to operate at the frequency synthesizer output rate or frequency, which is considerably less than the system clock rate. However, because the carrier-to-noise density ratio $C/N_o$ improves as the square of the clock frequency, as indicated above, the performance of the synthesizer will improve as higher system clock rates are employed.

Figure 3:
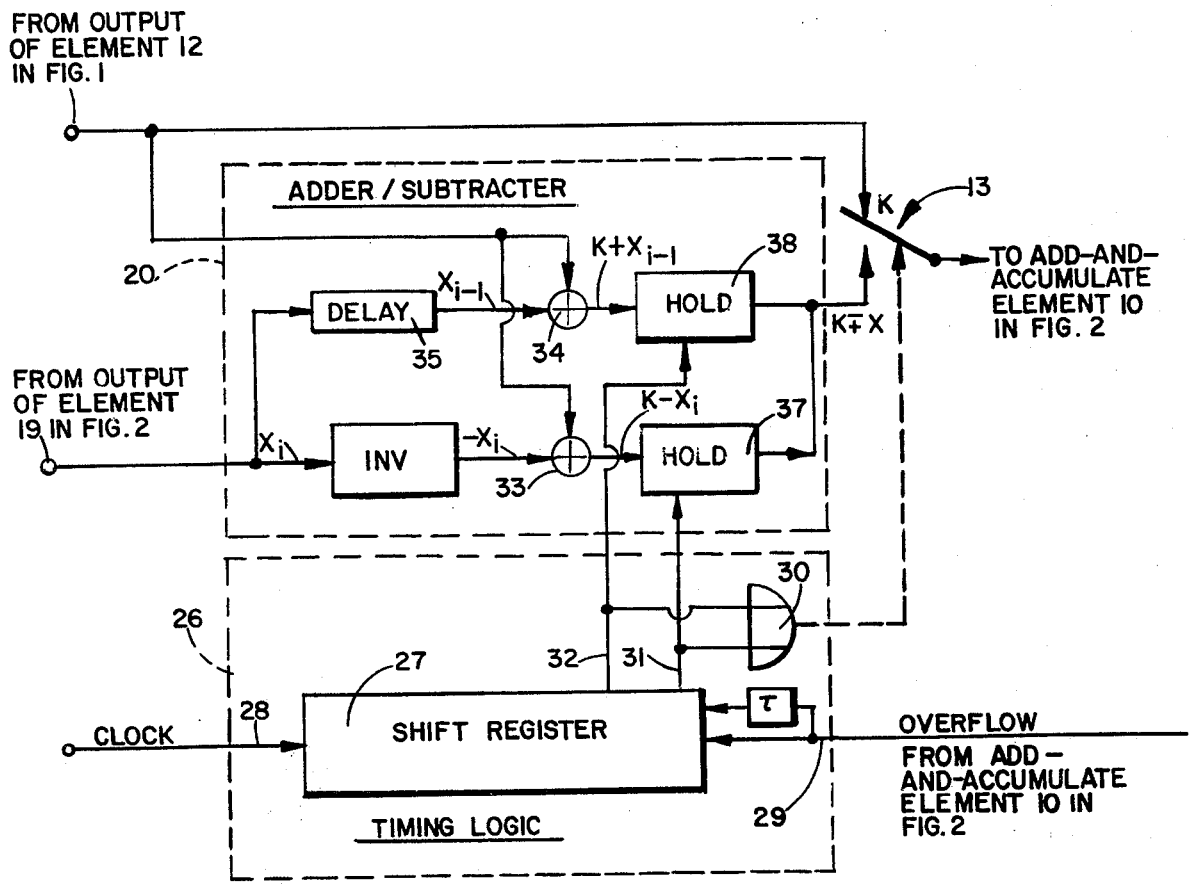
FIG. 3 is a block diagram, illustrating in further detail the jitter injection means of FIG. 2.

The means of effecting the substitution of one random value for another by adder/subtractor 20 of jitter logic element 15 is shown more particularly in FIG. 3.

Referring now to FIG. 3, there is illustrated partially in block diagram and partially in schematic form the adder/subtractor means 20 of FIG. 2 in cooperation with timing logic means 26. Timing logic means 26 is comprised of a clocked shift register 27 having a clock input 28 responsive to the system clock (not shown) and further having an input 29 responsive to the overflow output of the add/accumulator 10 (of FIG. 2). There is further provided OR gate 30 having a first and second gate input respectively coupled to a respective one of two taps or outputs of register 27, an output of gate 30 serving as a switching control for switch 13.

In normal operation, shift register 27 cooperates as a tapped delay line for an input applied by the periodic overflow from element 10 (of FIG. 2), in response to the applied clock rate on clock line 28, the input on line 29 progressing through the register stages sequentially to tap 31, and then to tap 32, as is well understood in the art (as is seen, for example, from FIG. 2 of U.S. Pat. No. 3,778,828 issued to W. H. McFarland for RANGE-GATED DIGITAL AMTI SYSTEM). Thus a switch control signal appears at the output of gate 30 in response to the respective delayed responses of taps 31 and 32, in turn, to the input applied to input line 29. The input on line 29 may be initially applied to reset register 27 and delayed, say one clock pulse, prior to application to a signal input of register 27. In this way, timing logic 26 is made useful over an entire library of frequencies of the digital frequency synthesizer of FIG. 1. Where the taps 31 and 32 are selected to correspond to an early portion of the register cycle, such selection will not interfere with adjustment or selection of the synthesized frequency.

Adder/subtractor 20 comprises first and second arithmetic combining means 33 and 34 for combining a respective one of two sequentially-occurring random values with the K-vector or phase increment value employed by the frequency synthesizer of FIG. 1. A first input of each of combiners 33 and 34 is commonly coupled to the output of frequency selector 12 (in FIG. 1) and a second input of each is coupled to the output of memory 19 (in FIG. 2), a delay being interposed at the second input of combiner 34. The respective outputs of combiners 33 and 34 are fed to respective ones of gated sample-and-hold means 37 and 38, a gating input of each of elements 37 and 38 being coupled to a respective one of taps 31 and 32 of register 27, and the outputs of elements 37 and 38 being commonly connected to a terminal of switch 13.

In normal cooperation of the elements comprising block 20 of FIG. 3, the delay provided by element 35 corresponds to the periodicity of the accumulator overflow, whereby the random value, $X_{i-1}$, applied to combiner 34 within one accumulation cycle or overflow period (i) is that value ($X_{i-1}$) extracted from memory 19 (in FIG. 2) in a preceding period (i $-1$), whereas the random value, $X_i$, applied to combiner 33 is that extracted from memory 19 during the current (i) period. Combiner 33 may serve to subtractively combine $X_i$ with K: $(K-X_i)$; and combiner 34 to additively combine $X_{i-1}$ and $K+X_{i-1}$. However, the practice of the invention is not so limited and element 33 could serve as an additive combiner and element 34 serve as a subtractive combiner; thus: $(K-X_{i-1})$ and $(K+X_i)$. The only criteria of consequence are that the random values employed be less than the K-vector or phase increment $(X<K)$ and that the sequential samples be combined with K in a mutually opposite sense or sign.

The combined value separately provided by operation of each elements 33 and 34 is stored in a respective one of data hold elements 37 and 38, for application to the input of element 10 (in FIG. 2) via switch 13. During the sub-intervals corresponding to taps 31 and 32 of shift register 27, the switch control output of gate 30 causes switch 13 to couple the outputs of elements 37 and 38 to the input of adder-and-accumulator 10. However, during that clock time corresponding to delay tap 31, only the value $(K-X_i)$ stored in element 37 is gated out, while during the clock time corresponding to delay tap 32 only the value $(K+X_{i-1})$ is gated-out. The concept of the invention is not restricted to such sequence of arrangement, and element 37 could be arranged alternatively to gate out in a clock interval subsequent to the gating-out of element 38.

Figure 7:
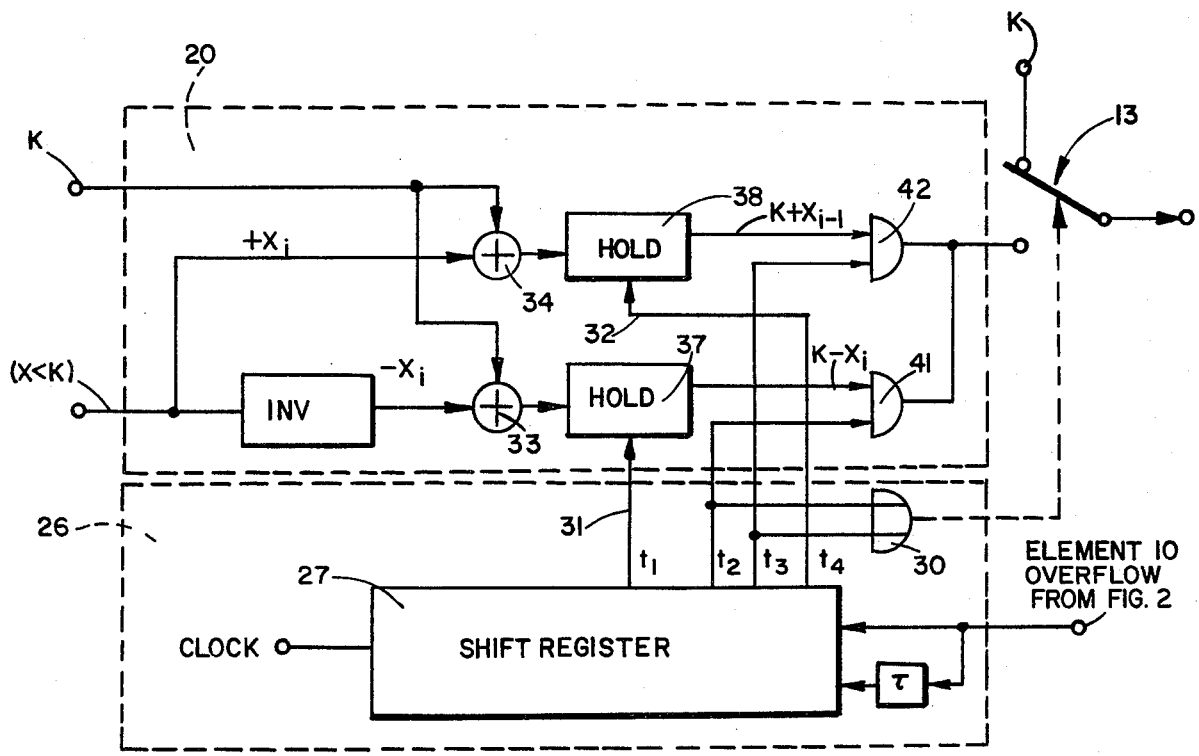
FIG. 7 is a block diagram of a preferred arrangement of the adder/substractor of FIG. 3.

In a preferred mechanization of adder/subtractor 20 of FIG. 3 the delay function schematically shown as element 35 in FIG. 3 may be provided by appropriate utilization of the delays provided by timing logic shift register 27, as shown more fully in FIG. 7.

Referring to FIG. 7, there are shown elements 27, 30, 33, 34, 37 and 38, similar to the like referenced elements of FIG. 3. Interposed between first and last taps 31 and 32, respectively, of shift register 27, are two intermediate taps $t_2$ and $t_3$ which are substituted for the gating inputs to OR gate 30. There are also provided a first and second signal gates 41 and 42 for gating the respective outputs of elements 37 and 38 to the output terminal of adder/subtractor 20 in response to a gate control input applied by a mutually exclusive one of taps $t_2$ and $t_3$ of register 27.

Although gates 41 and 42 have been illustrated for convenience as part of adder/subtractor 20, such elements could conceptually be considered part of the organization of switch 13.

In normal operation of the arrangement of FIG. 7, during an initial register overflow period (say i$-1$) of register 10 in FIG. 2), an earlier random value $X_{i-1}$ is combined with the value K at combiner 33, and the combined value $(K-X_{i-1})$ received into hold element 37 at delay time $t_1$; while such earlier random value $X_{i-1}$ is combined with the value K at combiner 34, and the combined value $(K+X_{i-1})$ received into hold element 38 at delay time $t_4$, signal gates 41 and 42 being operated intermediate the gating-in of hold elements 37 and 38. During the next register overflow period (i), tap $t_1$ gates in the current random value $(K-X_i)$ to hold element 37, while hold element 38 still holds the earlier random value $(K+X_{i-1})$. At tap time $t_2$, gate 30 switches-over switch 13, and gate 41 outputs the $(K-X_i)$ signal from hold element 37 to switch 13. At tap time $t_3$, gate 30 continues to switch-over switch 13, gate 41 switches off, and gate 42 outputs the earlier random value $(K+X_{i-1})$ signal from hold element 38 to switch 13. At tap time $t_4$, gate 30 restores switch 13 to the illustrated switch position in FIG. 7 and also gates-in the current random value $(K+X_i)$ to hold element 38 for use during the subsequent register overflow period $(i+1)$.

Figure 6:
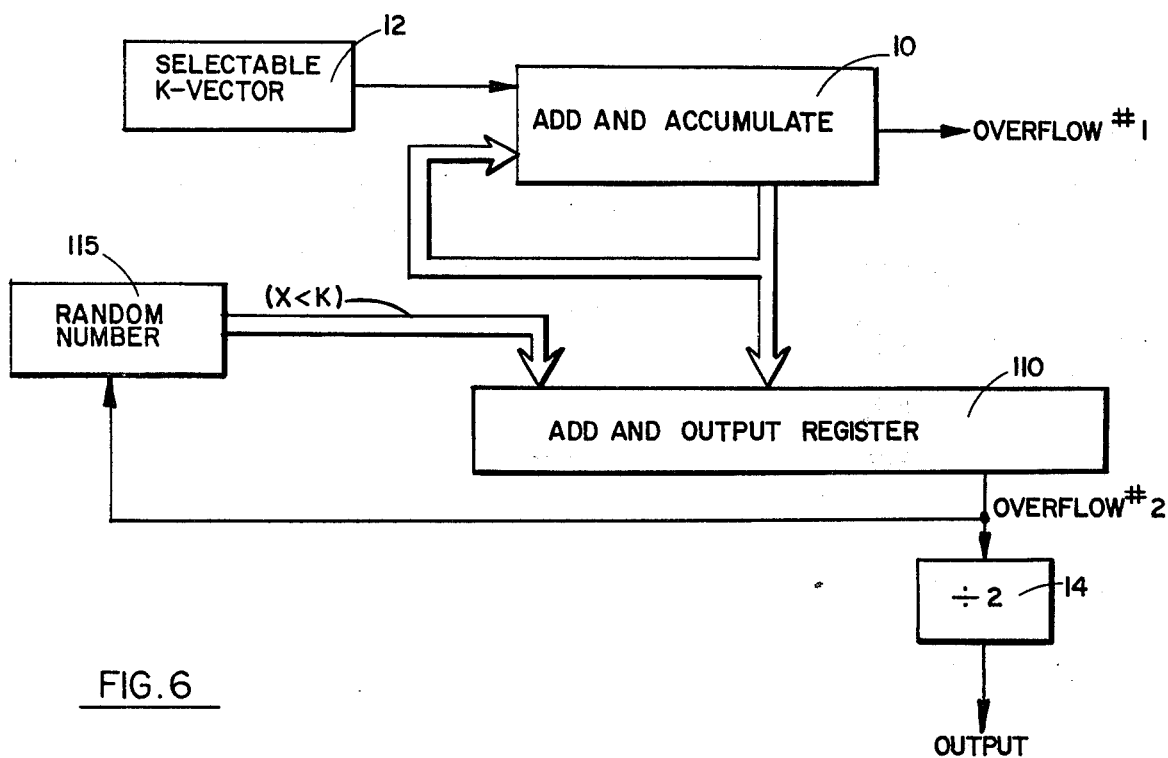
FIG. 6 is a block diagram of an alternate embodiment of the invention.

An alternative embodiment of the inventive concept, and which avoids the necessity of subsequently subtracting prior-inserted random phase increments, is shown in FIG. 6.

Referring now to FIG. 6, there is illustrated an alternate embodiment of the concept of the invention and employing a secondary add-and-output register 110 responsively coupled to the outputs of add-and-accumulate register 10 and a source 15 of random numbers $(X<K)$. In such an arrangement, an earlier-occurring random number $(X_{i-1})$ is added at secondary register 110 until overflow of secondary register 110 occurs. Then, the next random number $(X_i)$ is substituted for $(X_{i-1})$ as an input of register 110 until the next overflow of register 110. In this manner the random number does not recirculate (in the accumulator register 10) and therefore need not be cancelled. The cost of such feature, the addition of another complete N-bit register, is not deemed significant.

Thus, there has been disclosed improved means for randomly jittering a digital frequency synthesizer so as to avoid spurious spectral spikes and to reduce the level of the noise spectra, while preserving the average value of the synthesized carrier frequency.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a digital frequency synthesizer for synthesizing a selected frequency of a library of preselected frequencies in which a preselected phase increment K is repetitively supplied to a digital integrator which provides an output signal at said selected frequency, said digital integrator having an adder responsive to said phase increment K and an accumulating register having an overflow output and an input responsive to said adder, with the periodicity of said output signal corresponding to the periodic overflow of said register which has an average frequency corresponding to said selected frequency, the improvement comprising means for reducing discrete spectral spurs in said output signal by combining a random jittering signal with one of the input to and overflow output of the register, so that said output signal responds to said jittering signal and so that the average periodicity of the register overflow for a selected frequency is not affected by said jittering signal.

2. The device of claim 1 in which said means for reducing discrete spectral spurs comprises:

gated storage means for providing a random sequence of values $(X<K)$; and a secondary add and output register having a respective first and second input responsively coupled to a respective output of said gated storage means and said accumulating register, an overflow output of said secondary register being drivingly coupled to a gate control input of said gated storage means.

3. The device of claim 1 in which said means for reducing discrete spectral spurs comprises:

means for generating a sequence of random values; and jitter logic responsive to said means for generating and responsive to the overflow output of said accumulating register for injecting a sequential one of said random values as an input to said register for at least one clock interval occurring within the duration between successive overflows of said register.

4. The device of claim 3 in which said means for generating comprises:

a source of a random value; X; and means for combining said random value with the phase increment value to provide a combined value.

5. The device of claim 3 wherein said means for generating produces at least two $(X_{i-1}$ and $X_i)$ random values in sequence and in which said jitter logic comprises means for injecting said random value $X_i$ and the phase increment value K into the accumulating register during at least one clock interval within an overflow period of the accumulating register and for removing within another clock period of said overflow period said random value $(X_{i-1})$ which had been injected during a previous overflow period.

6. The device of claim 3 wherein said device is responsive to an external source of said selected phase increment (K) and in which said means for generating comprises:

a random value generator;

a comparator responsive to said random value generator and to said source of said selected phase increment (K) for providing a gating control signal in response to the condition $(X<K)$, wherein X refers to said sequential one of said random values; and gated storage means responsive to said random value generator and having a gate control input responsively coupled to an output of said comparator for storing in sequence of occurrence randomly-occurring values which satisfy said condition.

7. The device of claim 6 wherein said means for generating produces at least two $(X_{i-1}$ and $X_i)$ random values in sequence and in which said jitter logic comprises means for injecting said random value $X_i$ and the phase increment value K into the accumulating register during at least one clock interval within an overflow period of the accumulating register and for removing within another clock period of said overflow period said random value $(X_{i-1})$ which had been injected during a previous overflow period.

8. The device of claim 7 in which said jitter logic comprises:

clocked timing control means responsive to said accumulating register overflow for providing a first and second timing control signal;

adder/subtractor means responsive to said timing control signals, the output of said storage means, and to said selected phase increment for providing a first combined value $(K-X_i)$ as an output during a first preselected clock interval and a second combined value $(K+X_{i-1})$ as an output during a second preselected clock interval; and switching means for substituting said outputs of said adder/subtractor for said phase increment value as inputs to said accumulating register during said two preselected clock intervals.

9. In a digital frequency synthesizer for synthesizing a selected frequency of a library of preselected frequencies and for producing an output signal with a frequency equal to said selected frequency in which a selected phase increment K is repetitively supplied to a digital integrator having an adder and accumulating register operating in mutual cooperation, the resultant periodic overflow of the register corresponding to the selected frequency of interest, the improvement comprising means for reducing discrete spectral spurs in the output signal of the synthesizer by supplying a random jittering signal to the input of the register, whereby the average periodicity of the register overflow for a selected frequency is not affected.

10. The device of claim 9 in which said means for reducing discrete spectral spurs comprises:

means for generating a random sequence of values $(X_i<K)$ each of which is less than the phase increment value K;

adder/subtractor means for producing an output by algebraically combining a different one of said random values with said phase increment K during a first clock interval occurring within the duration between successive overflows of said accumulating register and oppositely combining said one random value with said phase increment during a second clock interval occurring within a successive duration of the accumulating register overflows, wherein said adder/subtractor means has an input coupled to said means for generating in order to receive said random values therefrom; and switching means for substituting said respective combined values for said phase increment value during said respective first and second clock intervals as applied inputs to said accumulating register, wherein said switching means has an output coupled to the input of said accumulating register, and wherein said switching means has an input coupled to the output of said adder/subtractor means.

11. The device of claim 9 in which said means for reducing discrete spectral spurs comprises:

means for generating a random sequence of values $(K\pm X)$, the difference between any one of which and the selected phase increment K is less than said phase increment; and jitter logic responsive to the overflow output of said accumulating register for substituting a sequential one of said random values $(K\pm X)$ for the value (K) as an input to said register for at least one clock interval occurring within the duration between successive overflows of said accumulating register.

12. The device of claim 11 in which said means for generating comprises:

means for generating a random value, X; and means for algebraically combining a random value less than the selected phase increment value $(X_i<K)$ with the phase increment value K to provide a first combined value during a first clock interval within said duration of said register overflow, and oppositely algebraically combining a previously random value $(X_{i-1}<K)$ with the phase increment value to provide a second combined value during a second clock interval within said duration.

13. The device of claim 12 in which said means for combining comprises:

a comparator responsive to said means for generating and to a source of said selected phase increment (K) for providing a gating control signal in response to the condition $(X<K)$; and gated storage means responsive to said means for generating a random value X and having a gate control input responsively coupled to an output of said comparator for storing in sequence of occurrence randomly-occurring values, X, which are less than the selected phase increment, K.

14. The device of claim 12 in which said jitter logic comprises double-throw switching means having a first switchable input adapted to be responsive to said selected phase increment value, and also having a second switchable input coupled to said means for combining, and further having a switching control input responsive to said clock intervals for coupling said second switchable input to said accumulating register, a mutually exclusive one of said combined values being fed to said shift register input during a mutually exclusive one of said clock intervals.

15. The device of claim 12 in which said jitter logic comprises means for substituting said first combined value for said phase increment value as an applied input to said register during said first clock interval, and substituting said second combined value for said phase increment value during said second clock-interval.

16. In a digitial frequency synthesizer for synthesizing a selected frequency of a library of preselected frequencies and for producing an output signal with a frequency equal to said selected frequency in which a selected phase increment is repetitively supplied to a digital integrator having an adder and accumulating register operating in mutual cooperation, the resultant periodic overflow of the register corresponding to the selected frequency of interest, the improvement comprising:

means for generating a random sequcy of values (X);

a comparator responsive to said means for generating and to a source of said selected phase increment (K) for providing a gating control signal in response to the condition $(X<K)$;

gated storage means responsive to said means for generating a random value X and having a gate control input responsively coupled to an output of said comparator for storing in sequence of occurrence randomly occurring values X which are less than the selected phase increment (K);

adder/subtractor means for algebraically combining a different one of said random values with said phase increment K during a first clock interval occurring within the duration between successive overflows of said accumulating register and oppositely combining said one random value with said phase increment during a second clock interval occurring within a successive duration of the accumulating register overflows, wherein said adder/subtractor means has an input coupled to said means for generating in order to receive said random sequence of values therefrom; and switching means for substituting a respective one of said combined values into said accumulating register for said phase increment value during said respective first and second clock intervals, wherein said switching means has an output coupled to the input of said accumulating register, and wherein said switching means has an input coupled to the output of said adder/subtractor means, whereby discrete spectral spurs in said output signal of the synthesizer are eliminated while the average periodicity of the register overflow for a selected frequency is not affected.

17. In a digital frequency synthesizer for synthesizing a selected frequency of a library of preselected frequencies in which a selected phase increment is repetitively supplied to a digital integrator having an adder and an accumulating register operating in mutual cooperation, the resultant periodic overflow of the register corresponding to the selected frequency of interest, the improvement comprising:

means for generating and storing a random sequence of values, each of which (X) is less than said phase increment;

clocked timing control means responsive to said accumulator overflow for providing a first and second timing control signal;

adder/subtractor means responsive to said timing control signals, an output of said means for storing and generating, and to said selected phase increment for providing a first combined value $(K-X_i)$ as an output during a first preselected clock interval and a second combined value $(K+X_{i-1})$ as an output during a second preselected clock interval of a given overflow period of said register, wherein said adder/subtractor means has an input coupled to said means for generating in order to receive said random sequence of values therefrom; and switching means for substituting said outputs of said adder/subtractor for said phase increment value as inputs to said accumulating register during said two preselected clock intervals of said overflow period, wherein said switching means has an output coupled to the input of said accumulating register, and wherein said switching means has an input coupled to the output of said adder/subtractor means, whereby discrete spectral spurs in the spectral output of the synthesizer are reduced while the average periodicity of the register overflow for a selected frequency is not affected.

* * * * *